United States Patent [19]

Mottate

[11] 4,433,876
[45] Feb. 28, 1984

[54] ROLLING BEARING FOR LINEAR MOTION
[75] Inventor: Tatsuo Mottate, Yokohama, Japan
[73] Assignee: Nippon Thompson Co., Ltd., Tokyo, Japan
[21] Appl. No.: 294,766
[22] Filed: Aug. 20, 1981
[30] Foreign Application Priority Data
  Mar. 12, 1981 [JP] Japan .................................. 56-35816
  Apr. 14, 1981 [JP] Japan .................................. 56-53509
[51] Int. Cl.$^3$ ............................................. F16C 29/06
[52] U.S. Cl. ................................. 308/6 C; 308/3 R; 308/6 R
[58] Field of Search ............. 308/6 R, 3 R, 3 A, 6 C, 308/3.8, 196

[56] References Cited

U.S. PATENT DOCUMENTS

| | | | |
|---|---|---|---|
| 2,009,421 | 7/1935 | Walz | 308/3 R |
| 2,994,567 | 8/1961 | Liebmann | 308/6 R |
| 3,342,534 | 9/1967 | King | 308/6 R |
| 3,938,854 | 2/1976 | Teramachi | 308/6 R |

FOREIGN PATENT DOCUMENTS 1052505  1/1954  France .................. 308/6 R

Primary Examiner—Stuart S. Levy
Assistant Examiner—Thomas R. Hannon
Attorney, Agent, or Firm—Trexler, Bushnell & Wolters, Ltd.

[57] ABSTRACT

The present invention relates to a rolling bearing for linear motion wherein a slide unit is mounted on a track rail. Track plates having track surfaces facing track surfaces on both sides of the track rail are fitted onto the inside surfaces of the slide unit and the slide unit is capable of making a linear motion against the track rail through rolling bodies mounted between the track surfaces of the track plates and the track surfaces of the track rail. The invention is characterized in that both track surfaces are constructed respectively by an upper half track surface and a lower half track surface, the upper contact point of the upper half track surface of the slide unit and the lower contact point of the lower half track surface of the track rail being located symmetric to the center of the ball with an angle less than 45 degrees from the vertical plane passing through the center of the ball, the lower contact point of the lower half track surface of the slide unit and the upper contact point of the upper half track surface of the track rail being located symmetric to the center of the ball with an angle more than 45 degrees from the vertical plane passing through the center of the ball. At least one of the track plates on the slide unit is pressed by a plug which is contacted by the end of a preload bolt screwed into the threaded hole in the slide unit body.

6 Claims, 12 Drawing Figures

ROLLING BEARING FOR LINEAR MOTION

BACKGROUND OF THE INVENTION (1) Field of the Invention

The present invention relates to a rolling bearing for linear motion wherein a slide unit is mounted on a track rail with, track plates having track surfaces facing track surfaces on both sides of the track being fitted symmetrically left and right at channel shaped inside surfaces of said slide unit and the slide unit is capable of making a linear motion against the track rail through rolling bodies mounted between the track surface of said track plate and the track surface of said track rail.

The present invention also relates to an improvement of a rolling bearing for linear motion comprising particularly a track rail provided with linear tracks symmetrically at left and right and a slide unit which is mounted on said track rail which accommodates a group of balls so that said balls roll endlessly along the tracks of said track rail.

(2) Explanation of Prior Art

One example of prior art rolling bearing for linear motion is shown in U.S. Pat. No. 3,938,854 specification. As shown in FIG. 6, the outline is as follows:

A slide unit 102, which is mounted on a track rail 101, is supported by 4 sets of tracks provided by an upper, lower, left and right portions of the track rail 101 and by balls 103, and performs a linear motion in the axial direction of the track rail 101. Radial loads in any direction perpendicular to the axis and moment loads imposed on the slide unit 102 are supported by 4 sets of group of balls.

In this prior art example, since 4 sets of upper, lower, left and right group of balls are installed, there were such disadvantages that, the overall construction of the rolling bearing for linear motion became complicated, the height of the section was increased, the number of machining operations increased resulting in high cost. Also, in particular, the 4 sets of ball groups were disposed in such a manner that the downward load was higher than the upward load.

As another prior art example there was one as shown in FIG. 7. In this example, the opposing surfaces of track rail 201 and slide unit 202 are made trapezoidal, with the upward, downward, left and right direction radial load and moment loads supported by the tracks and a group of balls 203 provided one set each at the left and the right slanted surfaces.

In this prior art example, since the track surface is provided at the slanted surface of a trapezoidal, there were disadvantages as, the height of the cross section was high, and an upward load capacity which supports the upward load was too small to be practical enough.

As shown in FIG. 8, in both of the previously described prior art examples, the contact and support force relation between track rail 301 and slide unit 302 was such that the contact positions between respective track surfaces 304, 305 and ball 303 were in 45° symmetry, as shown by arrows E, F, G, H, to opposing surface 306 of the track rail 301 and opposing surface 307 of the slide unit 302.

In both of the above prior art examples, since the height and width of the track rail 301 and the slide unit 302 become large, if installed on a slide surface of various equipment for a bearing for linear motion, the variety of equipment will become large for the sole reason of the configuration of the bearing, and thus there was a great demand for making the bearing compact.

Also in the above second prior art example, there was a demand to increase the upward load capacity.

Further, in a third prior art example as disclosed by U.S. Pat. No. 2,994,567 specification, as shown in FIG. 9, a slide unit 402 makes a linear motion on a track rail 401 through left and right groups of balls 403 which are retained freely for rolling in retainer 44 for left and right. However, in this case, the upper, lower, left and right four contact points between the ball group 403 and track surfaces of the track rail 402 and slide unit 402 are made in 45° symmetry left and right to the vertical surface, and thus the upward load capacity and downward load capacity are the same. Since the downward load capacity is not larger than the upward load capacity as is required in the normal state of use, if downward load capacity is increased by increasing the size of the construction, it will result in an increase of upward load capacity, and thus there is a disadvantage of unnecessarily increasing to a larger constructional size. Thus, there was a demand to increase the downward load capacity only without increasing the unnecessary upward load capacity and prevent the size from becoming large.

Further, in the prior art preload device for preloading the track plate 9 having the track surface 5 of the slide unit 2 of the rolling bearing for linear motion, as shown in FIG. 12, the track plate 9 is placed and fitted at inside surface 7 of slide unit main body 15 which faces the track surface 4 of side surface 6 of the track rail 1, and the construction is made so that at least one side of the surfaces of said track surface 9 (in the drawing, right side) is directly contacted by the end of a preload bolt 19 which is screwed in to advance or retract against the track plate 9 from the outer surface 10 of said slide unit main body 15, and thus is arranged to preadjust the preload force to be imposed on the rolling body which is ball 3 mounted between said both track surfaces 4, 5 and on said both track surfaces.

However, in this preload device, since the portion of pressure contact made on the track plate 9 is a small area of an end of a preload bolt, the preload force produced by the tightening force of the preload bolt 19 was not necessarily uniformly transmitted to the track surface 9, and frequently uneven forces were imposed on the track surface 9 and the advancing or retracting sliding of the track surface 9 was not smooth, and also since the contact area between the preload bolt 19 and track surface 9 was small, a large preload force could not be imposed. Therefore, a preload device without these disadvantages was desired.

SUMMARY OF THE INVENTION

In the present invention, the arrangement of the rolling bearing for linear motion is as follows.

In the rolling bearing for linear motion wherein a slide unit is mounted on a track rail, track plates having track surfaces facing track surfaces on both sides of the track rail are fitted symmetrically left and right at channel shaped inside surfaces of said slide unit, and the slide unit is capable of making a linear motion against the track rail through rolling bodies mounted between the track surface of said track plate and the track surface of said track rail, said rolling bearing for linear motion is constructed in such a manner that, on said track rail side, there are provided in the horizontal direction, at the vertical left and right outside surfaces, a pair of track surfaces where a group of balls roll, while, on the slide unit side where it faces said track surfaces, at the vertical left and right inside surfaces, there are provided in the horizontal direction a pair of track surfaces where the group of balls roll, said both track surfaces are constructed respectively by an upper half track surface and a lower half track surface, said track surfaces of said track rail and of said slide unit make contacts with the ball only at respective contact points of slide unit upper contact point which is located at the upper half track surface of the track surface of the slide unit and of track rail lower contact point which is located at the lower half track surface of the track surface of the track rail, both being symmetric each other to the center of the ball, and of slide unit lower contact point which is located at the lower half track surface of the track surface of the slide unit and of track rail upper contact point which is located at the upper half track surface of the track surface of the track rail, both being symmetric each other to the center of the ball, the track surfaces of said track rail and said slide unit are constructed so that said slide unit upper contact point and said track rail lower contact point are located symmetrically to the center of the ball with an angle less than 45° from the vertical plane passing through the center of the ball, and also said slide unit lower contact point and said track rail upper contact point are located symmetrically to the center of the ball with an angle more than 45° from the vertical plane passing through the center of the ball, at least one of the track plates of said slide unit is fitted onto the slide unit main body so that it can advance or retract against the corresponding track surface of the track rail, a threaded hole passes through on the slide unit main body from the outer surface towards said track plate, the end of a preload bolt screwed-in said threaded hole makes contact with a plug fitted slidably in the axial direction of said threaded hole, and that said plug is caused to make pressure contact at its plane of end face with a similar plane at the back portion of the track surface.

In the present invention, the arrangement of the rolling bearing for linear motion is also as follows.

On a track rail there are provided, in the horizontal direction at the vertical left and right outside surfaces, a pair of track surfaces where a group of balls roll, while, on the slide unit side where it faces said track surfaces, at the vertical left and right inside surfaces there are provided in the horizontal direction a pair of track surfaces where the group of balls roll, both of said track surfaces being constructed respectively by an upper half track surface and a lower half track surface. Said track surfaces of said track rail and of said slide unit make contact with the ball only at respective contact points of slide unit upper contact point which is located at the upper half track surface of the track surface of the slide unit and of track rail lower contact point which is located at the lower half track surface of the track surface of the track rail, both being symmetric relative to the center of the ball, and at a lower contact point which is located at the lower half track surface of the track surface of the slide unit and of track rail upper contact point which is located at the upper half track surface of the track surface of the track rail, both being symmetric to the center of the ball, the track surfaces of said track rail and said slide unit are constructed so that said slide unit upper contact point and said track rail lower contact point are located symmetrically to the center of the ball with an angle less than 45° from the vertical plane passing through the center of the ball, and also said slide unit lower contact point and said track rail upper contact point are located symmetrically to the center of the ball with an angle more than 45° from the vertical plane passing through the center of the ball.

In the present invention, the arrangement of the rolling bearing for linear motion is also as follows.

A track surface is provided on a track plate which advances or retracts by a preload device, and the construction of the preload device is as follows.

At least one of the track plates of said slide unit is fitted onto the slide unit main body so that it can advance or retract against the corresponding track surface of the track rail, a threaded hole passes through on the slide unit main body from the outer surface towards said track plate, the end of preload bolt screwed in said threaded hole makes contact with a plug fitted slidably in the axial direction of said threaded hole, and said plug is caused to make pressure contact at its plane of end face with a similar plane at the back portion of the track surface.

OBJECTS OF THE INVENTION

The object of the invention is to provide a low cost bearing in which said bearing is made compact, and at the same time, said bearing is capable to receive radial loads of all directions and moment loads, and further, said bearing has an upward load capacity and a downward load capacity which are practically most suitable.

Another object of the present invention is to provide a preload device which is capable to perform an easy and positive adjustment of the preload imposed between the track plate of the slide unit and the track rail.

Further objects of the present invention may become clear through an embodiment of the present invention as described in the following.

DETAILED EXPLANATION OF THE EMBODIMENT

Figure 1:
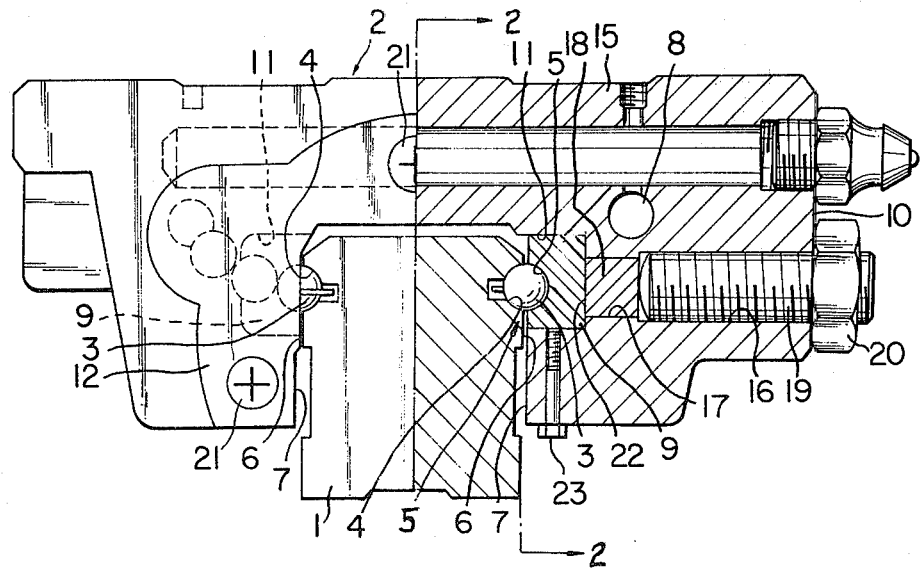
FIG. 1 is an embodiment according to the present invention, in which the left half portion shows an elevation view looking towards the direction of movement of the slide unit and the right half portion shows a cross section which is taken along line 1—1 of FIG. 4.
Figure 4:
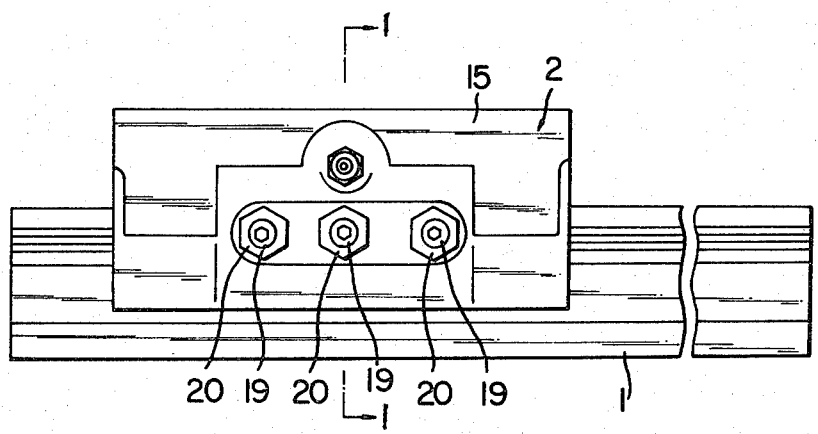
FIG. 4 is a side view of the above embodiment.

As shown in FIG. 1 and FIG. 4, in the present invention, slide unit 2 is mounted on track rail 1, and the slide unit makes a linear motion in the lengthwise direction of the track rail 1.

As shown in FIG. 1, said track rail 1 which is symmetric to the vertical plane passing through the center in the lengthwise direction has a shape of substantially rectangular cross section. Track surface 4 on the track rail 1 and track surface 5 on the slide unit 2, in which ball 3 rolls, are provided symmetrically left and right to said vertical plane passing through the center in the lengthwise direction, and are provided with only one set each respectively for left and right, and are positioned to face each other and arranged in a vertical outside surface 6 of track rail 1 and vertical inside surface 7 of slide unit 2.

Further, 8 is a return hole for the ball 3 which is provided in the slide unit 2.

Figure 2:
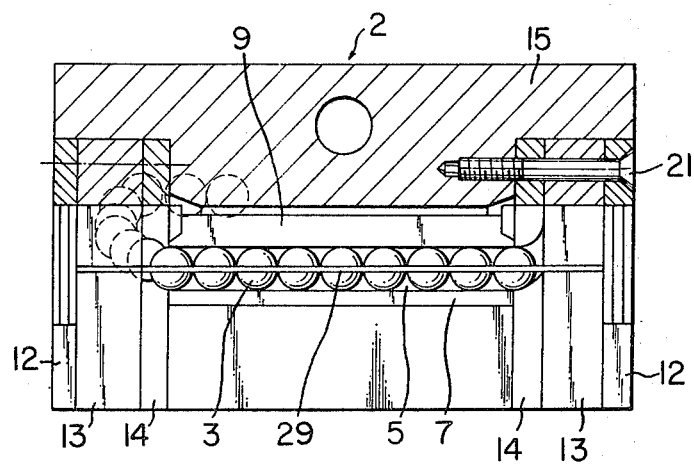
FIG. 2 is a cross section of the slide unit of the above embodiment which is taken along line 2—2 of FIG. 1.

FIG. 2 is a central longitudinal cross section of the slide unit 2 and shows ball 3 in relation with the track surfaces 5 at inside surface 7. The ball 3 is retained in the track surface 5 of the slide unit 2 by ball retainer 29.

Figure 3:
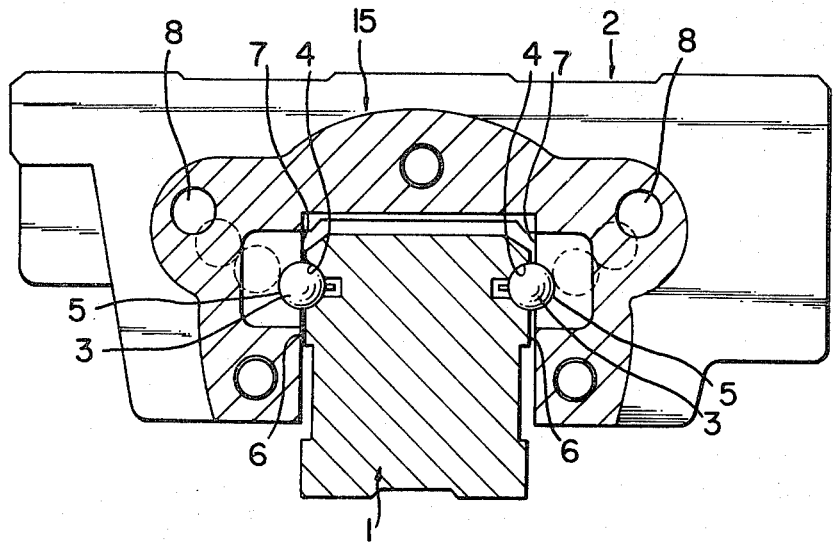
FIG. 3 is an elevation view of the above embodiment looking towards the direction of movement of the slide unit with seal, side plate and bearing retainer removed.

In FIG. 3, there is also shown the positional relationship between the slide unit main body 15 and the track rail 1 in a direction similar to FIG. 1 wherein seal 12, side plate 13 and bearing retainer 14 shown in FIG. 2 are removed.

Figure 5:
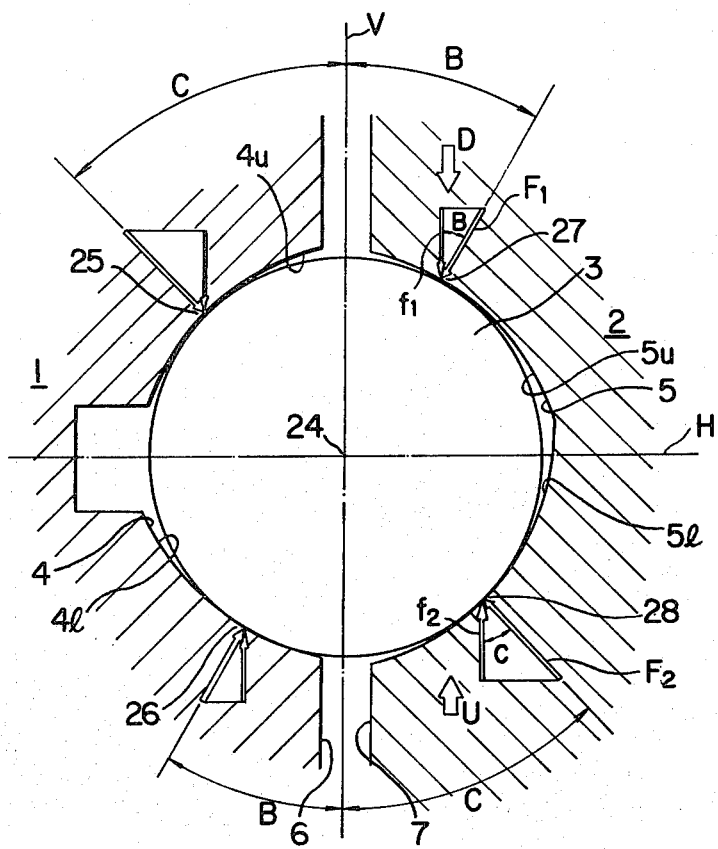
FIG. 5 is an illustrative drawing showing an enlarged detail of the portion shown by arrow 5 in FIG. 1 and illustrates both the positions of contacts between the track surfaces and the ball and the load relationship.
Figure 6:
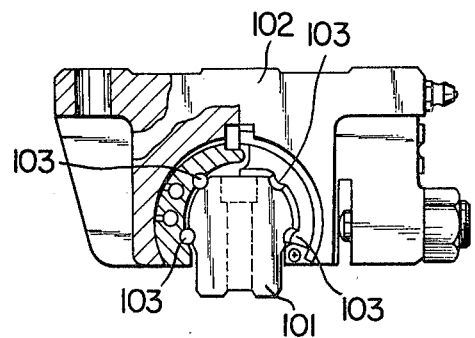
FIG. 6 is a partly cross-sectioned elevation view of a prior art slide looking towards the direction of movement of the slide unit.
Figure 7:
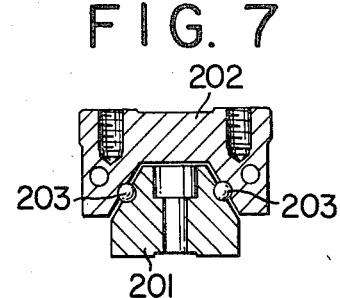
FIG. 7 is a cross sectional view showing another prior art assembly.
Figure 8:
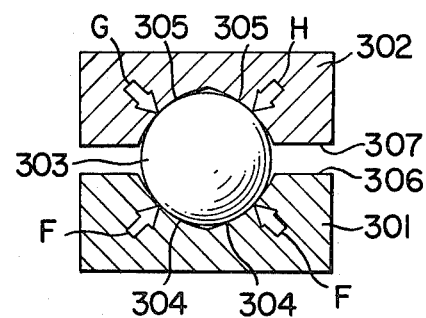
FIG. 8 is an enlarged cross sectional view showing the contact portions of the ball of the prior art.
Figure 9:
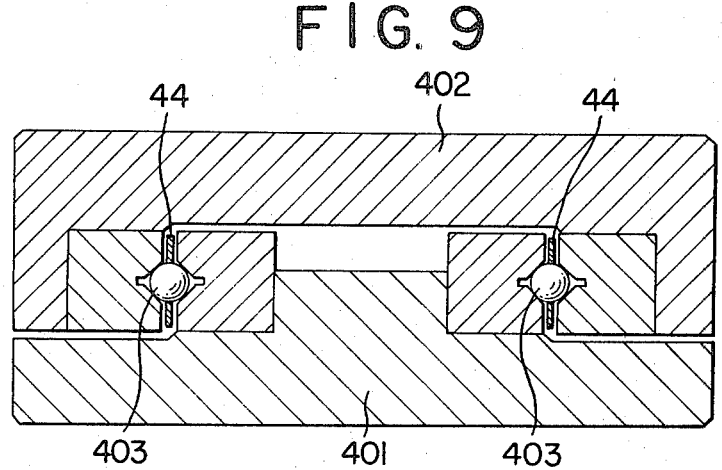
FIG. 9 is a rough cross sectional view of another prior art assembly.

Now, the state of contact between track surface 4 of said track rail 1 and the ball 3 as well as the state of contact between the surface track 5 of the slide unit 2 and the ball 3 are as shown in FIG. 5. The track surfaces 4 and 5 are formed so that the center 24 of the ball 3 is positioned intermediate the vertical outside surface 6 of the track rail 1 and the vertical inside surface 7 of the slide unit 2. Said track surface 4 comprises an upper half track surface 4u and a lower half track surface 4l which are formed respectively by a portion of a cylindrical surface having a radius larger than the radius of the ball 3. Similarly track surface 5 comprises an upper half track surface 5u and a lower half track surface 5l. Said upper half track surface 4u and lower half track 5l are shaped symmetrically to center 24, and also said lower half track surface 4l and upper half track surface 5u are similarly shaped symmetrically to center 24. The ball 3 and the track surface 4 have contacts at track rail higher contact point 25 for the upper half track surface 4u and at track rail lower contact point 26 for the lower half track surface 4l respectively. Also, the ball 3 and the track surface 5 have contacts at slide unit upper contact point 27 for the upper half track surface 5u and at slide unit lower contact point 28 for the lower half track surface 5l. The slide unit upper contact point 27 and the track rail lower contact point 26 are positioned symmetrically to center 24 of the ball and formed so that they are located in positions having angle B of less than 45° from the vertical plane passing through the center 24. Also the slide unit lower contact point 28 and the track rail upper contact point 25 are positioned symmetrically to center 24 and formed so that they are located in positions having angle C of more than 45° from the vertical plane passing through the center 24.

In order to maintain the respective contact positions, the upper half track surface 5u is formed by a portion of a cylindrical surface having its center on the line connecting the slide unit upper contact point 27 and the ball center 24 and the radius of curvature of said cylindrical surface being made a little larger than the radius of the ball 3, and similarly the shape of the lower half track surface 5l is formed by a portion of a cylindrical surface having a center on the line connecting the slide unit lower contact point 28 and the ball center 24 and the radius of curvature of said cylindrical surface is also made a little larger than the radius of ball 3. Also as described previously, the upper half track surface 4u on the track rail 1 and said lower half track surface 5l are shaped symmetrically to the ball center 24, and similarly, the lower half track surface 4l and said upper half track surface 5u are point symmetry to said center.

The inside surface 7 of said slide unit 2 is fitted with track plate 9. This track plate 9 is formed with the track surface 5 having substantially a shape of half cylindrical surface linearly at a position facing the track surface 4 of said track rail 1 and supports the ball 3. The cross section of this track plate 9 is substantially rectangular and is fitted slidably in the horizontal direction towards the track surface 4 of the track rail 1 inside a mating cavity 11 provided along the inside surface 7 of said slide unit main body 15.

On said slide unit main body 15, at the required places of mating cavity 11 (at 3 places in the embodiment shown in FIG. 4), threaded hole 16 is made to pass through horizontally to outer surface 10 of the slide unit 2. The inner surface of said threaded hole adjacent the mating cavity 11 is a plug sliding surface 17. At the portion of said plug sliding surface 17, a short cylindrical plug 18 is fitted slidably. Said threaded hole 16 has a preload bolt 19 screwed in to a position where it makes contact with said plug 18. Further, nut 20 is provided to prevent said preload bolt from turning in order to hold the screwed-in position of bolt 19.

Figure 10:
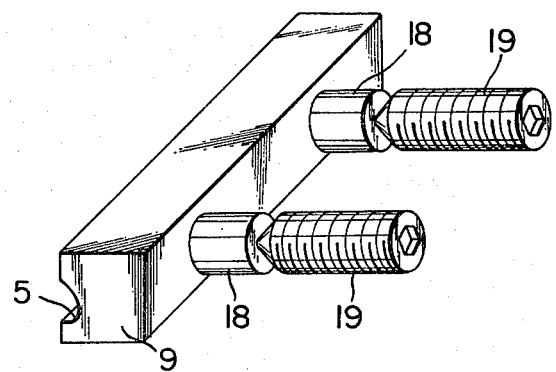
FIG. 10 is a perspective view of an embodiment according to the present invention showing the relationship of track plate, plug, and preload bolt.

FIG. 10 shows the positional relationship of said track plate 9, plug 18 and preload bolt 19 in an illustrative manner. Also as shown in FIG. 2, the track plate 9 fitted onto the slide unit main body 15 of the slide unit is fixed to the main body 15 by screw 21 at its both ends through track plate retainer 14, side plate 13 and seal 12.

Nextly, the function and effect of the present invention will be explained.

As shown in FIG. 5, V is a vertical line passing through the center 24, H is a horizontal line, B is an angle formed by the line connecting the slide unit upper contact point 27 and the center 24 and the vertical live V, and C is an angle formed by the line connecting the slide unit lower contact point 28 and the center 24 and the vertical line V.

A downward load imposed on the slide unit 2 is shown by arrow D, and an upward load by arrow U. If the load imposed on the ball 3 at the slide unit upper contact point 27 due to said downward load D is assumed to be $f_1$, the load capacity between the slide unit 2 and the ball 3 at the slide unit upper contact point 27, namely, the load that is affected by the load capacity of the bearing will be load $F_1$ which is the load in the normal direction, and the following relationship exists.

$$F_1 = \frac{f_1}{\cos B}$$

Similarly, if the load imposed on the ball 3 at the slide unit lower contact point 28 due to the upward load U is assumed to be $f_2$, the load that is affected by the load capacity of the bearing at the slide unit lower contact point 28 will be $F_2$ which is the load in the normal direction and the following relationship exists.

$$F_2 = \frac{f_2}{\cos C}$$

Generally, in the case of load imposed on the bearing, the downward load D is far more and larger than the upward load U. Therefore, in the present invention, even if $f_1$ is larger than $f_2$, since angle B is made smaller than 45° and angle C is made larger than 45°, $F_1$ is small against $F_2$ and the downward load capacity is large and the upward load capacity is small, and it is effected so that there is a difference between the downward load capacity and the upward load capacity in the bearing.

Further, if angle B is made too small, the slide unit upper contact point 27 will be positioned close to the upper end of the upper half track surface $5u$ of the slide unit 2 and stress concentration will be caused near the upper end of the upper half track surface $5u$, and thus there is danger to cause breakage of the slide unit 2 at this position, and thus there is a limit to make angle B small. After a result of various studies made, it was found that the optimum range was angle B=30°-40°.

For instance, if angle B=37°, angle C=48°, $\cos B=0.7986 \quad \cos C=0.6691$ therefore, if it is assumed that $F_1 = F_2$ $$\frac{f_1}{f_2} = 1.195$$

Thus it will be possible to more suitably proportion the downward load capacity and the upward load capacity of the bearing.

Further, in the slide unit 2 of the present invention, the track plate 9 which supports the ball 3, as described previously, is arranged so that its back surface forming a plane opposite to the track surface 5 is imposed with a tightening force of the preload bolt 19 through the plug 18. Said plug 18 slides on the plug sliding surface 17 and is capable to advance or retract. Also since said plug 18 contacts the back surface of the track plate 9 by the whole end face 22 which is a plane perpendicular to the cylinder axis of the plug 18, the preload imposed on the track plate 9 is given a uniform force by the plug 18. Thus the sliding advancement and retraction of the track plate 9 are performed smoothly. Also the contact area between the plug 18 and the track plate 9 is the area of the end face 22 of the plug 18 and is far larger than the contact area made directly by the conventional preload bolt. Therefore, it will become possible to impose an uniform and large preload on the track plate 9. Thus, the range of adjustment of the preload between track surfaces 4, 5 and ball group 3 is expanded to meet the magnitude and direction of load caused by an installed body mounted and fixed on the slide unit 2. As a result, a desirable load relationship can be obtained on the rolling bearing for linear motion.

Further, the track plate 9 which is given a proper preload by the preload bolt 19 through the plug 18 is preferably to be fixed by a retaining bolt 23.

Also, similarly to the previously described arrangement of imposing an uniform preload on the track plate 9 by the plug 18 and the preload bolt 19, in the retaining bolt 23 which fixes the track plate 9 onto the slide unit main body 15, it is possible to make an arrangement to fix the track plate 9 onto the slide unit main body 15 through a plug.

Figure 11:
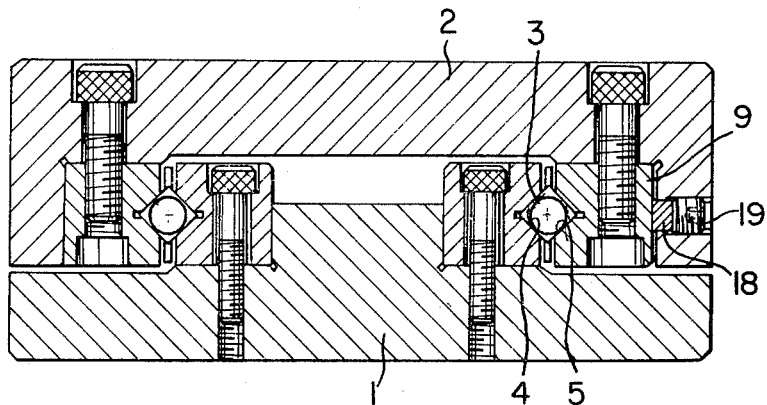
FIG. 11 is an elevation view of another embodiment according to the present invention showing the state of preload of the track plate in the bearing for linear motion.
Figure 12:
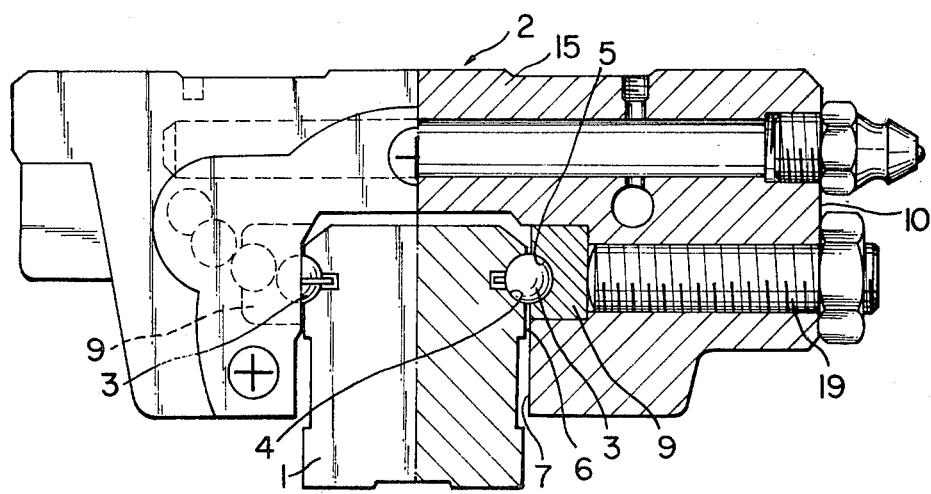
FIG. 12 is a cross sectional view showing the preload state of the track plate in prior art.

Also, in another type of the rolling bearing for linear motion such as shown in FIG. 11, the preload between the track surface 4 of the track rail 1, the track surface 5 of the slide unit 2 and roller 3, which is a rolling body mounted between the track surfaces 4 and 5, is possible to be made uniform and large by arranging so that said preload is imposed on the track plate 9 by the preload bolt 19 through the plug 18 of a short cylindrical shape.

In the present invention, by making an arrangement as described in the claims, the track surface is provide on the vertical outside surface of the rectangularly shaped narrow track rail, and thus, it is possible to provide the track surface on the vertical inside surface of the slide unit, and therefore, it is possible to make the overall height of the bearing low, and moreover, by changing the contact angle of the contact point between the ball and the slide unit, the downward load capacity of the ball at this vertical position is enhanced, and in spite of the opposing respective track surfaces of the track rail and the slide unit are provided on side surfaces which are vertical, it is possible to obtain a bearing which possesses a proper load capacity which does not differ from those of prior art in which track surfaces are arranged in a slanted plane having a certain angle from the vertical plane, and further, radial loads of any direction and moment load imposed on the slide unit can be supported by one set each of group of balls for left and right, and thus, this is a superior invention.

The present invention also, when imposing a preload by the preload bolt on the track plate which supports the ball for the slide unit, it is arranged so that it is imposed through a plug having a short cylindrical shape with large end face area as previously described, and thus, it becomes possible to impose a larger preload on the track plate uniformly. As a result, regardless of the magnitude and direction of the load imposed by an installed body mounted and fixed on the slide unit, it became possible to impose an adjustable preload on the track surfaces of both the track rail and the slide unit and on the rolling body mounted between said both tracks which meets said load, and thus it became possible to operate the rolling bearing for linear motion smoothly and possitively.

I claim:

1. A rolling bearing for linear motion wherein a slide unit is mounted on a track rail, track plates having track surfaces facing track surfaces on both sides of the track rail are fitted symmetrically left and right at channel shaped inside surfaces of said slide unit, and the slide unit is capable of making a linear motion against the track rail through rolling balls mounted between the track surface of said track plate and the track surface of said track rail, characterized in that: said track plate track surface and said track rail track surface are on opposite sides of a vertical plane through the centers of said balls, on said track rail side, there are provided, in the horizontal direction at the vertical left and right outside surfaces, a pair of track surfaces where a group of balls roll, while on the slide unit side where it faces said track surfaces, at the vertical left and right inside surfaces there are provided in the horizontal direction a pair of track surfaces where the group of balls roll, said both track surfaces are constructed respectively by an upper half track surface and a lower half track surface, said track surfaces of said track rail and of said slide unit make contacts with the ball only at respective contact points of slide unit upper contact point which is located at the upper half track surface of the track surface of the slide unit and of track rail lower contact point which is located at the lower half track surface of the track surface of the track rail, both being symmetric each other to the center of the ball, and of slide unit lower contact point which is located at the lower half track surface of the track surface of the slide unit and of track rail upper contact point which is located at the upper half track surface of the track surface of the track rail, both being symmetric each other to the center of the ball, and that, the track surfaces of said track rail and said slide unit are constructed so that said slide unit upper contact point and said track rail lower contact point are located symmetrically to the center of the ball with an angle between substantially 30 degrees and substantially 40 degrees from the vertical plane passing through the center of the ball, and also said slide unit lower contact point and said track rail upper contact point are located symmetrically to the center of the ball with an angle more than 45 degrees from the vertical plane passing through the center of the ball, said contact points being assymmetrically disposed relative to said vertical plane.

2. A rolling bearing for linear motion wherein a slide unit is mounted on a track rail, track plates having track surfaces facing track surfaces on both sides of the track rail are fitted symmetrically left and right at channel shaped inside surfaces of said slide unit, and the slide unit is capable of making a linear motion against the track rail through rolling bodies mounted between the track surface of said track plate and the track surface of said track rail, characterized in that: at least one of the track plates of said slide unit is fitted onto the slide unit main body so that it can advance or retract against the corresponding track surface of the track rail, a threaded hole passes through on the slide unit main body from the outer surface toward said track plate, the end of a preload bolt screwed in said threaded hole makes contact with a plug fitted slidably in the axial direction of said threaded hole, said plug being cylindrical and having a longitudinal axis substantially perpendicular to the respective track plate, the outer end of said plug being flat and perpendicular to said longitudinal axis, and that said plug is cuased to make pressure contact at its plane of end face with a similar plane at the back portion of the track surface, said bolt having at its inner end a maximum length along the center line thereof to engage said plug flat face and to compensate for misalignment of said bolt and said plug.

3. A rolling bearing for linear motion wherein a slide unit is mounted on a track rail, track plates having track surfaces facing track surfaces on both sides of the track rail are fitted symmetrically left and right at channel shaped inside surfaces of said slide unit, and the slide unit is capable of making a linear motion against the track rail through rolling bodies mounted between the track surface of said track plate and the track surface of said track rail, characterized in that:

on said track rail side, there are provided in the horizontal direction at the vertical left and right outside surfaces, a pair of track surfaces where a group of balls roll, while, on the slide unit side where it faces said track surfaces, at the vertical left and right inside surfaces there are provided in the horizontal direction a pair of track surfaces where the group of balls roll, said both track surfaces are constructed respectively by an upper half track surface and a lower half track surface, said truck surfaces of said track rail and of said slide unit make contacts with the ball only at respective contact points of slide unit upper contact point which is located at the upper half track surface of the track surface of the slide unit and of track rail lower contact point which is located at the lower half track surface of the track surface of the track rail, both being symmetric each other to the center of the ball, and of slide unit lower contact point which is located at the lower half track surface of the track surface of the slide unit and of track rail upper contact point which is located at the upper half track surface of the track surface of the track rail, both being symmetric each other to the center of the ball, the track surfaces of said track rail and said slide unit are constructed so that said slide unit upper contact point and said track rail lower contact point are located symmetrically to the center of the ball with an angle less than 45° from the vertical plane passing through the center of the ball, and also said slide unit lower contact point and said track rail upper contact point are located symmetrically to the center of the ball with an angle more than 45° from the vertical plane passing through the center of the ball, at least one of the track plates of said slide unit is fitted onto the slide unit main body so that it can advance or retract against the corresponding track surface of the track rail, a threaded hole passes through on the slide unit main body from the outer surface towards said track plate, the end of a preload bolt screwed in said threaded hole makes contact with a plug fitted slidably in the axial direction of said threaded hole, and that said plug is caused to make pressure contact at its plane of end face with a similar plane at the back portion of the track surface.

4. A roller bearing for linear motion comprising a slide unit, a track rail, and means for mounting said slide unit for linear motion on said track rail, said mounting means including symmetrically disposed pairs of tracks on said rail and said slide unit respectively adjacent opposite sides of said track unit, and a plurality of balls disposed in said tracks in rolling engagement therewith, the tracks of each pair lying on opposite sides of a vertical plane through the ball axes, each pair of tracks comprising a track surface on said rail and a confronting surface on said slide unit, each of said surfaces comprising a cylindrical upper half track surface and a lower cylindrical half track surface, each of said balls making contact at contact points with the upper and lower half track surfaces and having a center and a predetermined radius, said half track surfaces being symmetric about said center, the rail track upper half track surface being opposite the slide unit lower half track surface and the upper slide unit half track surface being opposite said rail lower half track surface relative to said center, the center of each half track surface lying on a line between the respective contact points and said ball center and each half track surface having a radius greater than the radius of said ball, said ball having a contact point with each half track surface, said contact points being assymetric relative to said vertical plane.

5. A roller bearing as set forth in claim 4 wherein a line between the contact points of the slide unit upper half track surface and the rail lower half track surface forms a first angle with the vertical of less than substantially 45°, and a line between contact points of the rail upper half track surface and the slide unit lower half track surface forms a second angle with the vertical of greater than substantially 45°.

6. A roller bearing as set forth in claim 5 wherein the first angle is between substantially 30° and substantially 40°.

* * * * *